United States Patent
Suer (10) Patent No.: US 12,132,647 B2
(45) Date of Patent: Oct. 29, 2024

(54) ADAPTIVE MULTIPATH SCHEDULER

(71) Applicant: Robert Bosch GmbH, Stuttgart (DE)

(72) Inventor: Marie-Theres Suer, Braunschweig (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/170,406

(22) Filed: Feb. 16, 2023

(65) Prior Publication Data

US 2024/0283730 A1    Aug. 22, 2024

(51) Int. Cl.
| | | |
|---|---|---|
| G06F 15/173 | (2006.01) | |
| H04L 45/00 | (2022.01) | |
| H04L 45/12 | (2022.01) | |
| H04L 45/24 | (2022.01) | |

(52) U.S. Cl.
CPC ............ *H04L 45/24* (2013.01); *H04L 45/123* (2013.01); *H04L 45/22* (2013.01)

(58) Field of Classification Search
CPC ....... H04L 45/22; H04L 45/24; H04L 45/243; H04L 45/123
USPC .................................................. 709/238–239
See application file for complete search history.

(56) References Cited

U.S. PATENT DOCUMENTS

| | | | | |
|---|---|---|---|---|
| 8,064,327 | B2 * | 11/2011 | Kwon ................. | H04L 27/2647 370/208 |
| 11,240,140 | B2 * | 2/2022 | Hitz ..................... | H04L 45/121 |
| 2005/0169209 | A1 * | 8/2005 | Miu .................. | H04W 28/0861 370/328 |
| 2007/0015461 | A1 * | 1/2007 | Park .................... | H04W 72/542 455/13.1 |

(Continued)

FOREIGN PATENT DOCUMENTS

EP    3860064 A1    8/2021

OTHER PUBLICATIONS

Suer, et al.: "Multi-Connectivity as an Enabler for Reliable Low Latency Communications—An Overview", IEEE Communications Surveys & Tutorials, IEEE, USA, 22(1), (2019), pp. 156-169, XP011778012.

(Continued)

*Primary Examiner* — Bharat Barot
(74) *Attorney, Agent, or Firm* — NORTON ROSE FULBRIGHT US LLP; Gerard A. Messina (57) ABSTRACT

A method for the adaptive selection of a scheduling scheme for a data packet transmission in a multipath communication system. The method includes determining at least two transmission path parameters for each transmission path of at least two transmission paths of two or more transmission paths for a multiplicity of data packets, the multiplicity of data packets being transmitted via the two or more transmission paths; determining a correlation between at least one transmission path parameter of at least two transmission (Continued)

path parameters of a transmission path and a corresponding transmission path parameter of at least two transmission path parameters of one or more other transmission paths from the two or more transmission paths for the multiplicity of data packets; and adaptive selection of a scheduling scheme for a data packet transmission via the two or more transmission paths based on the determined transmission path parameters and the correlation.

14 Claims, 5 Drawing Sheets

(56) References Cited

U.S. PATENT DOCUMENTS

2008/0232307 A1* 9/2008 Pi ..................... H04L 1/1607
370/328
2011/0090851 A1* 4/2011 Khalil .................... H04L 47/36
370/328
2020/0259738 A1* 8/2020 Wang .................... H04L 45/245
2023/0354152 A1* 11/2023 Bangolae .............. H04W 40/22

OTHER PUBLICATIONS

Suer, et al.: "Impact of Link Heterogeneity and Link Correlation on Multi-Connectivity Scheduling Schemes for Reliable Low-Latency Communication," 2020 IEEE International Conference On Communications Workshops (ICC Workshops), (2020), pp. 1-6, XP033796343.

Wu, et al.: "Peekaboo: Learning-Based Multipath Scheduling for Dynamic Heterogeneous Environments," IEEE Journal on Selected Areas in Communications, IEEE Service Center, Piscataway, US, 38(10), (2020), pp. 2295-2310, XP011808970.

* cited by examiner

ADAPTIVE MULTIPATH SCHEDULER

FIELD

The present invention relates to techniques for an adaptive selection of a scheduling scheme for a data packet transmission in a multipath communication system. Related aspects of the present invention pertain to a computer program, an adaptive multipath scheduler, and to a multipath communication system.

BACKGROUND INFORMATION

Methods such as Multipath TCP (multipath transmission control protocol), multipath-QUIC ("Multipath Quick UDP Internet Connections", abbreviated as "Multipath QUIC"), or dual connectivity at the PDCP layer (dual connectivity at the packet data convergence protocol layer") in 3GPP (3rd Generation Partnership Project) are examples of conventional protocols in the framework of which multiple transmission paths of a multipath communication system can be used for a data packet transmission between two devices (between a transmitter and a receiver). However, the few existing methods from the related art use a single scheduling scheme during the data packet transmission via multiple transmission paths. In addition, in some methods from the related art, the duplication of data packets can be activated or deactivated under certain circumstances during the data packet transmission (the so-called packet duplication scheme). Depending on the current scenario of the data transmission (e.g., depending on a current network load, a signal strength of a transmitter or a combination thereof), the one or the other scheduling scheme of different scheduling schemes may achieve a better quality of service in the data transmission (for instance with regard to a transmission latency, reliability, security, required width, or a combination thereof) in comparison with the rest of the scheduling schemes. Some of the existing methods may possibly not consider this circumstance because only one scheduling scheme is used.

Thus, there is a need for the development of new techniques for multipath communication systems that can solve some or all the above-mentioned problems.

SUMMARY

A first general aspect of the present invention relates to a method for the adaptive selection of a scheduling scheme for a data packet transmission in a multipath communication system. According to an example embodiment of the present invention, the method includes the determination of at least two transmission path parameters for each transmission path of at least two transmission paths from the two or more transmission paths for a multiplicity of data packets. The multiplicity of data packets of the first aspect is transmitted via the two or more transmission paths of the multipath communication system. In addition, the method includes the determination of a correlation between at least one transmission path parameter of at least two transmission path parameters of a transmission path and a corresponding transmission path parameter of at least two transmission path parameters of one or more other transmission paths from the two or more transmission paths for the multiplicity of data packets. In a next step, the method of the first aspect includes the adaptive selection of a scheduling scheme for a data packet transmission via the two or more transmission paths based on the determined transmission path parameters and the correlation.

A second general aspect of the present invention relates to a computer program, which is designed to execute the method according to the first general aspect of the present invention.

A third general aspect of the present invention relates to an adaptive multipath scheduler of a multipath communication system, which is designed to execute the method according to the first general aspect of the present invention and/or to execute the computer program according to the second general aspect of the present invention.

A fourth general aspect of the present invention relates to a multipath communication system, which includes an adaptive multipath scheduler according to the third aspect of the present invention. In addition, the multipath communication system according to the fourth aspect of the present invention includes a transmitter, which is designed to transmit a multiplicity of data packets to the receiver. The transmitter of the fourth aspect of the present invention is able to be connected to the receiver via two or more transmission paths. The multipath communication system of the fourth aspect is designed to execute the method according to the first general aspect of the present invention.

The techniques of the first to the fourth general aspects of the present invention may provide one or more of the following advantages.

Firstly, in comparison with other available scheduling schemes, the present techniques may make it possible to adaptively select a scheduling scheme of a multipath communication system for a data packet transmission by determining the characteristics of the different transmission paths of the multipath communication system (such as different transmission path parameters as well as possible correlations between transmission path parameters of different transmission paths) in real time. As a result, the quality of service in the data packet transmission via multiple transmission paths may be better than in some other methods from the related art.

Secondly, the techniques of the present invention offer the possibility of determining a (global) network load in the multipath communication system in real time, which in turn may assist in deciding which scheduling scheme is able to ensure the best quality of service in real time in comparison with the other available scheduling schemes (such as at a certain instant of the data packet transmission).

Some terms in the present disclosure are used in the following way:

A 'transmitter' (e.g., a transmitter unit) in this disclosure may be any data source. A transmitter in an uplink direction (that is, the data packet transmission direction that runs in the direction of a telecommunication network from the viewpoint of a user terminal), for instance, can be an audio, video, radio, TV, sensor data transmitter (such as a mobile telephone, a computer, a laptop, a music player or a tablet), which is able to transmit data packets via corresponding transmission paths. In WLAN terminology, the transmitter may be referred to as a station or a transmission node (e.g., a mobile telephone, a computer or some other above-mentioned device that is equipped with a WLAN adapter or some other network device). In WLAN terminology, the 'transmitter' may in some cases be understood as a WLAN client of the station or the transmission node (such as an application). The term 'transmitter' in connection with a mobile network is understood as a user terminal (or 'user equipment', abbreviated as UE), which is equipped with one or more mobile broadband adapters (e.g., a multi-SIM device) or some other device. In some examples, the transmitter is able to be operated in a live-streaming mode. In some cases, data packets (such as digital or analog signals that correspond to these data packets) are able to be output to a unit that is allocated to the selected transmission path on the transmitter side. More specifically, a data packet can be output to an (internal or external) network device of the transmitter allocated to the selected transmission path in order to transmit the data packet to the receiver with the aid of this network device.

A 'receiver' involves a receiver which is located at a distance from a transmitter and able to receive (e.g., directly via corresponding transmission paths) the data packets transmitted by a transmitter. In the present disclosure, a 'receiver' in connection with WLAN technology in an uplink direction describes a wireless access point (abbreviated as 'access point' (AP)). In some cases, the term 'receiver' may include a base station of a mobile radio network in an uplink direction if data packets are transmitted via the mobile radio network.

In the case of a downlink direction (that is, the data packet transmission direction that originates from the direction of a telecommunication network from the viewpoint of a user terminal), the 'receiver' in the present disclosure will correspond to the above-defined 'transmitter' of the uplink direction. In addition, the 'transmitter' of the downlink direction will correspond to the above-defined 'receiver' of the uplink direction.

The term 'transmission path' is understood as a communication path (or communication route) between an above-defined transmitter and a receiver which are able to communicate with each other with the aid of the communication path. The transmitter may be connected to the receiver via multiple (different) transmission paths so that the multipath communication system includes multiple transmission paths together with the transmitter and the receiver. Two transmission paths may differ spatially, e.g., if they extend between a transmitter and receivers (such as two or more access points) that are situated at different locations. In some cases, two transmission paths may differ in that they use different frequency channels or frequency bands for the data packet transmission (for instance, a transmitter transmits data packets to a receiver via two or more frequency channels or frequency bands, which leads to the formation of two or more corresponding transmission paths). In some examples, two transmission paths differ by the different radio access technologies that are used. In some examples, two different transmission paths may have a random combination of the above-mentioned differences. Two different transmission paths may use identical or different communication protocols (e.g., WLAN protocols of the IEEE-802.11 family such as 802.11ah or later protocols) for the data packet transmission. The radio connection may be developed as a WLAN connection, a WPAN connection (e.g., using a transmission protocol of the IEEE 802.15.4 standard) as the mobile radio connection, for instance developed as a UMTS, GPRS, 4G, LTE, or 5G connection.

The term 'transmission path parameter' describes any parameter relevant to the transmission of a data packet on a transmission path or a parameter of the transmission path that influences the transmission of the data packet. A signal-to-noise ratio (SNR) of data packets of the transmission path is an example of such a transmission path parameter. A wait queue length of the transmission path on the transmitter side is also a transmission path parameter in the sense of the present invention. For example, the wait queue length can be defined as a number of data packets in the wait queue (e.g., on the transmitter side) that is to be transmitted via the respective transmission path. A transmission latency (abbreviated as latency) may likewise be a transmission path parameter of the transmission path. In the framework of the present invention, a latency of the transmission path may be understood as a time that is required to transmit the data packet on the transmission path from the transmitter to the receiver. In addition, a jitter, which denotes a fluctuation of the latencies in the transmission via a transmission path, may be selected as a transmission path parameter. For example, a transmission data rate, abbreviated as data rate (defined, for instance, as a number of data units transmitted per time unit), a transmission capacity or a transmission bandwidth may be among the transmission path parameters. The further, non-exhaustive, examples of transmission path parameters include a loss probability of the transmission path and a packet loss rate of the transmission path, the latter describing the number of data packets lost during the transmission relative to the number of transmitted data packets.

In the framework of the present invention, a 'correlation' between one or more transmission path parameters and one or more transmission path parameters of another transmission path describes the extent to which one or more transmission path parameters of a transmission path (such as a latency, a signal-to-noise ratio, a packet loss rate or similar things) are subject to change (e.g., in terms of time) when data packets are transmitted via a different transmission path that is characterized by corresponding transmission path parameters. In other words: a correlation between different transmission paths may describe the way in which the transmission path parameters of the different transmission paths are linked in terms of time (this will be addressed in greater detail below). In this sense, it is also possible to talk of 'the correlation' between two or more transmission paths.

Accordingly, the term 'quality of service' includes the quality of a communication connection (also denoted by QoS) via such a transmission path, which is described based on a set of previously defined transmission path parameters. For this reason, these QoS parameters may include things such as a data rate, a transmission capacity, a latency, a transmission bandwidth, a transmission reliability (e.g., maximum frame loss, a maximum number of bit errors, a maximum probability of CRC errors, a necessity of a redundant transmission), a jitter or a combination thereof. In this context, the quality of service may additionally also include further characteristics such as an IT security and/or a functional safety or reliability. The IT security may relate to the protection of data (such as messages) with regard to their integrity, among other things, if a message may not be modified on its way (e.g., during the transmission of data within a communication system and/or between the communication system and other systems). On the other hand, a functional safety or reliability in the present techniques is to be understood as the operational safety (which may change as a result of an excessive latency, for instance), or in other words, the protection of persons and the environment.

Accordingly, the term 'communication network' includes the previously defined transmission paths between one or more transmitters and a corresponding receiver or receivers. In this sense, these transmission paths and the communication network formed in this way are able to transmit data packets via one or more WLAN networks or via one or more mobile networks. In connection with the data packet transmission via multiple transmission paths, the communication network of the present invention may experience a (global)

network load that can be characterized by a network parameter such as a network load parameter (further related details will be addressed below).

The term 'multipath communication system' is meant to describe any infrastructure for the transmission of data packets via multiple transmission paths within this multipath communication system. In addition, the multipath communication system includes the previously defined communication network. The multipath communication system of the present invention may include subsystems, e.g., as mentioned above, a transmitter (such as a mobile telephone, a computer or a laptop), and one or more receivers (such as one or more access points), which may be connected by corresponding transmission paths of the multipath communication system and able to communicate with one another. The communication system can also include two or more transmitters, which are connected to one or more respective receivers by transmission paths of the multipath communication system. In addition, the receiver and/or the transmitter may transmit information to other devices or receive information and or requests from the other devices that are not part of the multipath communication system.

A 'scheduling scheme' for a data packet transmission in a multipath communication system of the present invention decides which data packets (or their fragments) are transmitted via which transmission path (e.g., from a transmitter to a receiver, as discussed earlier). In addition, the 'scheduling scheme' can specify in which sequence and/or to which data points data packets are transmitted via the transmission paths of the communication system (such as from a transmitter to the multiple receivers), which will be described in greater details below.

For example, a 'data packet' may include video data, voice data, measuring data or messages. The data packet may also include encoded data such as data that were encoded using an encoding technology. The data packet is able to be transmitted on the transmission path from the transmitter to the receiver. In the present disclosure, a multiplicity of data packets may include test data packets (i.e., data packets whose content is of no importance to the user), which are able to be used for the adaptive selection of a scheduling scheme for a data packet transmission in a multipath communication system.

DETAILED DESCRIPTION OF EXAMPLE EMBODIMENTS

Figure 3A:
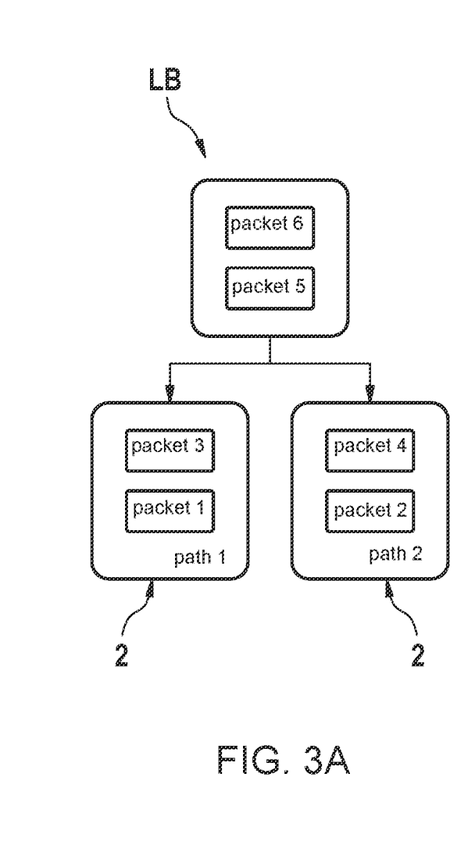
FIGS. 3A to 3C schematically show three exemplary scheduling schemes 10 for a data packet transmission of a multipath communication system on the transmitter side. LB: 'load balancing', abbreviated as LB); PD: packet duplication or PD in abbreviated form; PS packet fragmentation or splitting, or PS in abbreviated form.
Figure 3B:
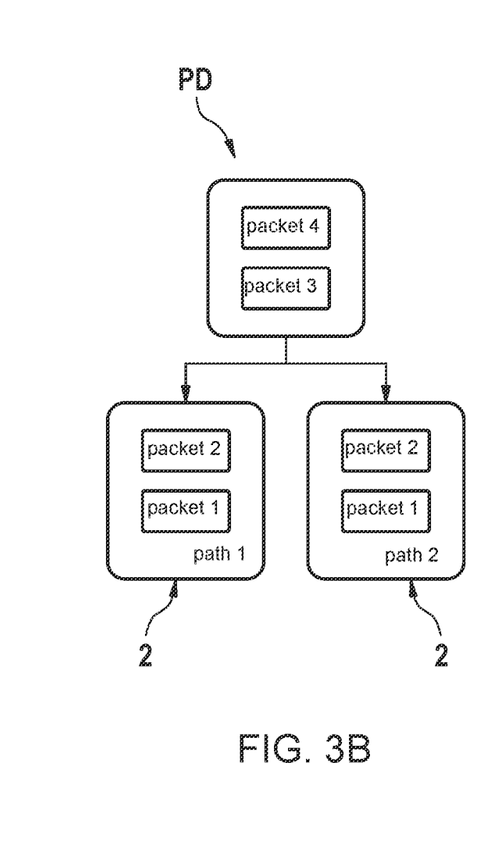
Figure 3C:
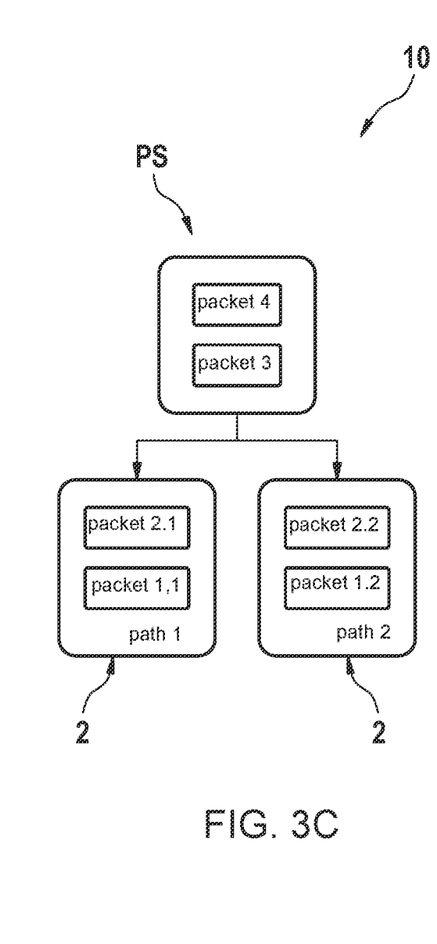
Figure 4:
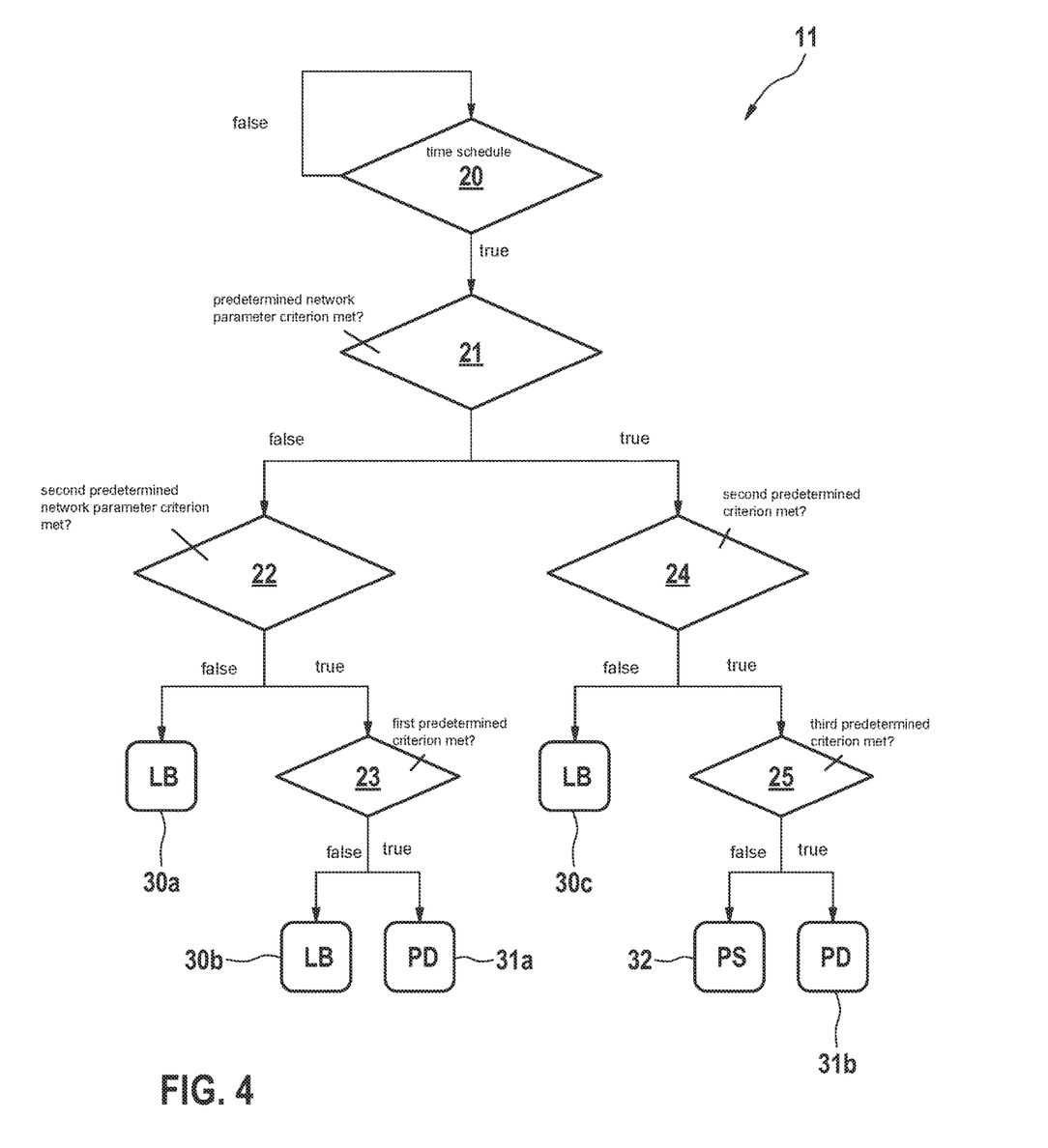
FIG. 4 schematically shows a flow diagram 11 and further aspects of a method according to an example embodiment of the present invention for the adaptive selection of a scheduling scheme LB; PD; PS for a data packet transmission in a multipath communication system 1.

To begin with, techniques for the adaptive selection of a scheduling scheme for a data packed transmission in a multipath communication system will be described with the aid of FIGS. 1A and 1B Next, an exemplary structure of a multipath communication system is described with the aid of FIG. 2. Then, three exemplary scheduling schemes for a data packet transmission of a multipath communication system are illustrated in FIGS. 3A to 3C. Following this, one possible embodiment and further aspects of a method according to the present invention are illustrated in FIG. 4. Lastly, based on FIG. 5, an architecture for an implementation of the scheduling schemes using an adaptive multipath scheduler is described.

Figure 1A:
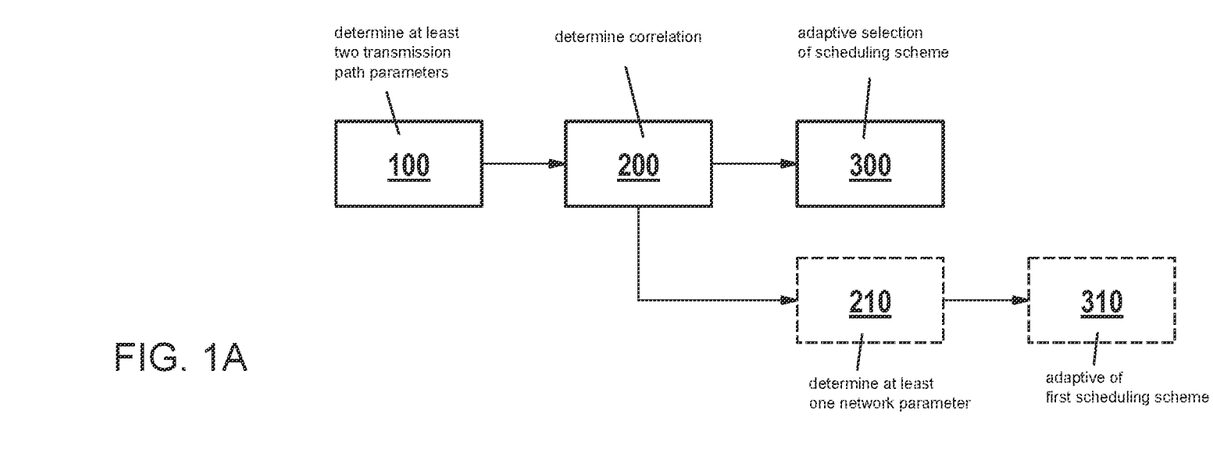
FIG. 1A is a flow diagram, which represents an example of an adaptive selection of a scheduling scheme for a data packet transmission in a multipath communication system according to the first aspect of the present invention.
Figure 1B:
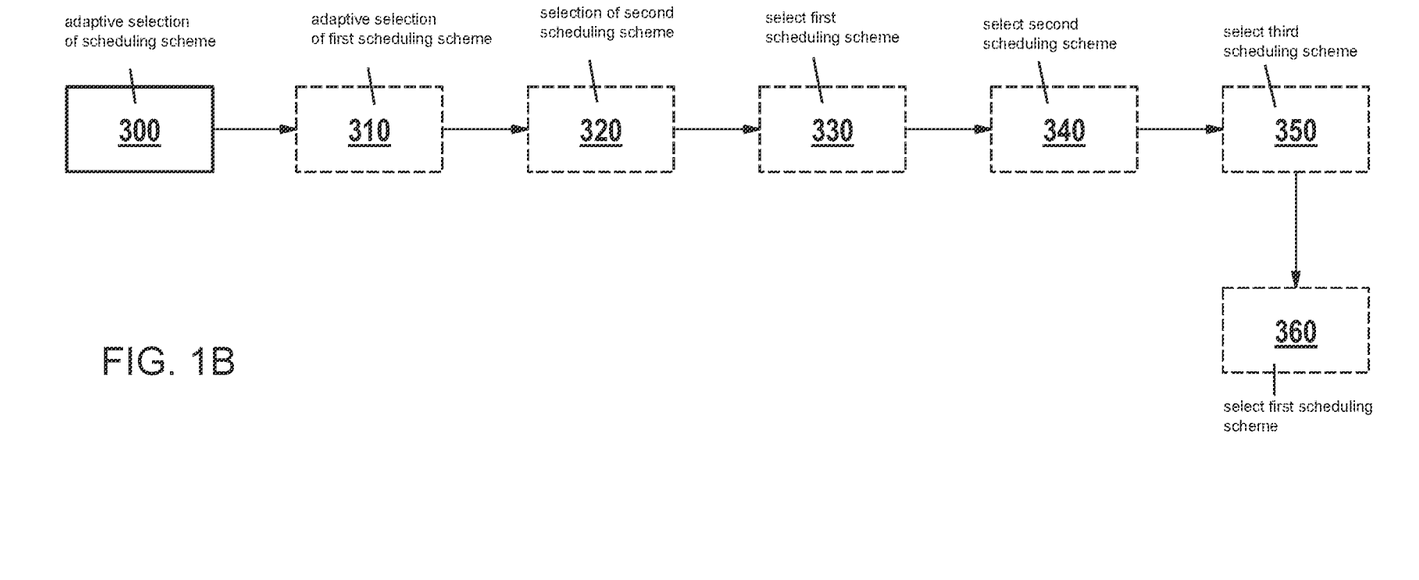
FIG. 1B is a flow diagram, which shows further possible method steps according to the first aspect of the present invention.

As shown FIGS. 1A and 1B, a first general aspect of the present invention relates to a method for the adaptive selection of a scheduling scheme LB; PD; PS for a data packet transmission in a multipath communication system 1. In the present techniques, the adaptive selection of a scheduling scheme, as described in greater detail below, means that the scheduling scheme is able to be selected during the data packet transmission (that is, in a real-time operation) in such a way (e.g., at a specific point in time) that this selected scheduling scheme can ensure a better quality of service (such as a lower latency or a lower loss probability of data packets) than the other existing scheduling schemes. The specific examples for the data packet transmission in the uplink direction discussed in the following text are meant to illustrate the application of the present techniques. However, the teaching contained therein is not restricted to the uplink direction and, for example, may be used for the data packet transmission in the downlink direction. The method steps are shown by the boxes characterized by solid lines in FIGS. 1A and 1B, while some of the method steps are illustrated in the boxes shown by dashed lines.

The first step of the present method includes the determination 100 of at least two transmission path parameters for each transmission path (such as a signal-to-noise ratio and a wait queue length on the transmitter side) of at least two transmission paths 2 from the two or more transmission paths for a multiplicity of data packets. In some cases, the at least two transmission path parameters for each transmission path (e.g., for the three transmission paths shown in FIG. 2) can be determined from the two or more transmission paths for the multiplicity of data packets. In the present invention, the multiplicity of data packets is transmitted via the two or more transmission paths of the multipath communication system. In some cases, the multipath communication system may include one or more transmitters 3 (for instance one or more mobile telephones and/or one or more computers), and one or more receivers 4 (such as one or more access points).

Figure 2:
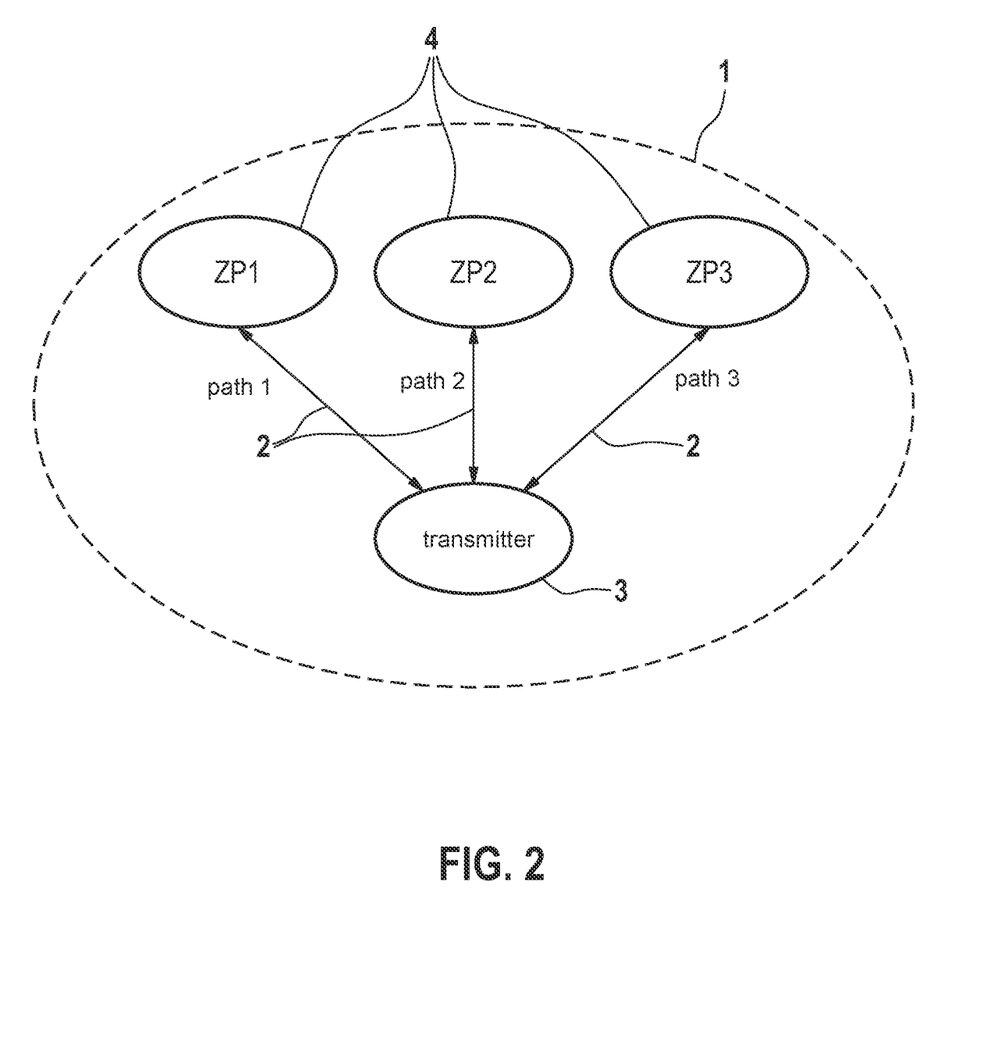
FIG. 2 schematically shows an exemplary structure of a multipath communication system 1, which includes a transmitter 3, three wireless access points 4 (ZP1-ZP3), and corresponding transmission paths 2 via which the transmitter and the access points are able to exchange data with one another.

In the example of FIG. 2, a multipath communication system 1 is schematically illustrated, which has a transmitter 3, three receivers 4 (access points ZP1 to ZP3), and three transmission paths 2, via which the transmitter and the receivers are able to be connected to one another. In this example, data packets of the multiplicity of data packets can be transmitted from transmitter 3 to respective receiver "4; ZP1-ZP3" via a transmission path "2; path1-path3". As mentioned earlier already, the transmitter can be connected to the receiver via multiple (different) transmission paths. For example, a transmission path on transmitter side 3 is able to transmit data packets to first access point AP1 via a WLAN connection using one frequency channel, and the other transmission path on transmitter side 3 is able to transmit data packets to first access point AP1 via the WLAN connection with the aid of another frequency channel. In some cases, a transmission path on the transmitter side can transmit data packets via a WLAN connection while the two other transmission paths may be allocated to a mobile network in each case (provided by two different mobile radio network operators, for instance), so that data packets are transmitted via a corresponding mobile radio connection (such as to a corresponding base station (not shown in FIG. 3).

In some cases, the transmission path may include a transmitter end point included by the transmitter and a receiver end point included by the receiver. The transmitter end point may be a protocol starting point of a communication protocol (abbreviated as 'protocol transmitter') for the transmission of the data packet from the transmitter to the receiver (e.g., from a transmitter unit to a receiver unit). The transmitter end point may be part of the transmitter, for instance of a network device of the transmitter. In the present disclosure, the receiver end point may be a protocol end point of a communication protocol (abbreviated as 'protocol receiver') for the transmission of the data packet from the transmitter to the receiver. In addition, the receiver end point may be part of the receiver. The transmission path may preferably extend from the transmitter, in particular via or through the network device of the transmitter allocated to the transmission path, to the protocol end point of the receiver. For example, transmitter 3 is able to be set up to transmit a data packet of the multiplicity of data packets via a respective interface to receiver 4. The receiver may in turn be set up to receive the data packet (such as via one or more respective interfaces). In the sense of the present invention, each pair of the transmitter-side and receiver-side interfaces may be part of a respective transmission path.

In the present disclosure, the at least two transmission path parameters of a transmission path of at least two transmission paths (e.g., a first transmission path, a second transmission path, or some other transmission path that differs from the first and second transmission path) may include a respective wait queue length and a signal-to-noise ratio (SNR) of data packets from the multiplicity of data packets that are transmitted via the transmission path of at least two transmission paths. In some cases, a packet loss rate or a contention window, abbreviated as CW, may be one of the transmission path parameters that is an indicator of packet losses. As mentioned above, a latency, a jitter, a data rate, a packet loss rate, a transmission reliability or a combination thereof may be the further transmission path parameters of the transmission path. Returning to the example of FIG. 2: the wait queue lengths of data packets on transmitter side 3 and the signal-to-noise ratios of data packets that were transmitted from transmitter 3 to the three access points ZP1 to ZP3 are able to be determined for all three transmission paths "2; path1-path3". For example, the wait queue lengths on the transmitter side may be determined, while the signal-to-noise ratios can be determined on the receiver side, for instance by a corresponding component of the transmitter (or receiver) or an external component with regard to the transmitter (or receiver) to which it is connected. In some cases, the receiver and the transmitter may exchange information about the transmission path parameters with one another (for instance via a corresponding transmission path). As an alternative or in addition, the information about the transmission path parameters may be transmitted to an adaptive multipath scheduler 5 (by the transmitter and/or receiver, for instance) and analyzed there (see FIG. 5 and further discussions).

Next, the present techniques include the determination 200 of a correlation between at least one transmission path parameter of at least two transmission path parameters of a transmission path and a corresponding transmission path parameter of at least two transmission path parameters of one or multiple other transmission paths from the two or more transmission paths for the multiplicity of data packets. As mentioned above, the correlation between the transmission path parameters of different transmission paths may characterize the extent to which transmission path parameters (such as a wait queue length, an SNR or one of the other above-mentioned transmission path parameters) of an individual transmission path depend on the transmission path parameters of another or of multiple other transmission paths. For example, one or more transmission path parameters of a first transmission path may change if the data packets are transmitted via another transmission path that differs from the first transmission path (e.g., when the same transmitter transmits the data via the two transmission paths to two different receivers). In one example, the correlation is able to be described with the aid of a Pearson correlation coefficient. In some cases, the transmission path parameters of the transmission paths may change over time so that the correlation between the transmission path parameters of the involved transmission paths may be a function of time.

The next step of the present method includes the adaptive selection 300 of a scheduling scheme for a data packet transmission via the two or more transmission paths based at least on the determined transmission path parameters and the correlation. Three exemplary scheduling schemes 10 for a data packet transmission of the multipath communication system 1 on the transmitter side are schematically illustrated for two transmission paths in FIGS. 3A to 3C. In the load balancing scheme (LB), each packet is individually transmitted only via one transmission path (data packets 1 and 3 of FIG. 3A are transmitted via "path 1" while data packets 2 and 4 are transmitted via "path 2"). In the example of the packet duplication scheme (PD), the data packet is replicated and transmitted via one transmission path while its duplicate is transmitted via one or more other transmission paths (the data packets 1 and 3 in FIG. 3B are transmitted via "path 1" and their duplicates are transmitted via "path 2"). When the packet fragmentation scheme is used for the data packet transmission (or, in other words, for the distribution of the data packets via the transmission paths), then the data packet is fragmented and its fragments are transmitted via one or multiple other transmission paths (fragments 1.1 and 2.1 of data packets 1 and 2 in FIG. 3C are transmitted via "path 1" while fragments 1.2 and 2.2 of the same data packets 1 and 2 are transmitted via "path 2").

The method of the present invention may include the determination 210 of at least one network parameter of a communication network of the multipath communication system. For example, the at least one network parameter of the communication network of the multipath communication system (e.g., the multipath communication system illustrated in FIG. 2) may be a network load parameter which describes a network load that may vary over time (for more details, see the text below). In some cases, information about the network load parameter is able to be transmitted from one or more receivers to the respective transmitters (such as to all transmitters) and/or to the multipath scheduler. In the case of the WLAN connection (e.g., using the IEEE Standard 802.11), this information can be determined by an access point and transmitted with the aid of the beacon messages (in English also denoted as "beacon frame" in the standards IEEE 802.11) to the respective transmitters (e.g., in an additional field of the beacon message). In addition, the step of "the adaptive selection" may be carried out based on the at least one network parameter (such as the network load parameter) of the communication network.

In the present techniques, the adaptive selection of the scheduling scheme for the data packet transmission (that is, in a real time operation, as mentioned above) may take place via the two or more transmission paths according to a time schedule 20. In one example, the time schedule may include that a predetermined number of data packets from the multiplicity of data packets should be transmitted prior to the adaptive selection (in other words, if this condition 20 is not satisfied, the previously used scheduling scheme will continue to be used for the data packet transmission). The time schedule in other examples may include that data packets from the multiplicity of data packets should be transmitted within a predetermined time interval before the adaptive selection is implemented.

As an alternative or in addition, the adaptive selection of the scheduling scheme for the data packet transmission via the two or more transmission paths may take place automatically after a predetermined trigger event. In one example, the predetermined trigger event may include that one or more transmission path parameters of one or more transmission paths satisfies or satisfy a transmission path parameter criterion. For instance, the transmission path parameter criterion may include that the one or more transmission path parameters (e.g., a jitter, a wait queue length, a latency, a packet loss rate, or a combination thereof) of one or more transmission paths exceed (s) a predetermined threshold value. In still other examples, the predetermined trigger event may include that the one or more transmission path parameters (such as a signal-to-noise ratio, a data rate, or a combination thereof) of one or more transmission paths fall below a predetermined threshold value. In other examples, the predetermined trigger event may include that a change in the one or more transmission path parameters of one or more transmission paths satisfies a change criterion. For instance, the change criterion may include that a change in the one or more transmission path parameters (e.g., a change in the signal-to-noise ratio, the wait queue length, the latency, the data rate, or a combination thereof) of one or more transmission paths exceeds a predetermined change threshold value of the transmission path parameter.

In other words, the predetermined trigger event is able to be defined based on a requirement of the afore-described quality of service (including the quality of service in connection with the IT security and/or the functional safety or reliability) that one or more transmission paths of the multipath communication system should satisfy. In some cases, an application on the transmitter side that is able (or would like) to communicate via corresponding transmission paths will report a connection wish to the adaptive multipath scheduler and/or to a corresponding component of the transmitter (possibly while indicating the desired or required QOS parameters). In some cases, the predetermined trigger event may include information about a predetermined value of the network parameter (e.g., the network load parameter), above which (or below which) the adaptive selection should be carried out.

In the present techniques, a first predetermined network parameter criterion and a second predetermined network parameter criterion are able to be allocated the at least one network parameter of the communication network. For example, the first predetermined network parameter criterion 21 may include that the at least one network parameter of the communication network falls below a first predetermined threshold value. In addition, the second predetermined network criterion 22 may include that the at least one network parameter of the communication network falls below a second predetermined threshold value, the second predetermined threshold value being greater than the first predetermined threshold value. As described above, a network load parameter, for example, may be selected as one such a network parameter. In some examples, the network load parameter may represent a network loading in the communication network in relation to an available network capacity of the communication network. The network load parameter, for example, may be the relationship between the network load in the communication network and the available network capacity. The network load is able to be calculated at a specific instant, for example when the data packets are transmitted from one or more transmitters using corresponding scheduling schemes, for instance before the adaptive selection of the first aspect is carried out (a scheduling scheme of a transmitter may differ from a scheduling scheme of another transmitter or be the same). In other examples, a network load is able to be calculated as an average value of network loads across a predetermined time interval. In addition, the network capacity may represent a data traffic volume via the transmission paths that the communication network is able to handle at a specific point in time (e.g., data packets can be transmitted from one or more transmitters at a predetermined quality of service).

In some examples, the network load may be proportional to a number of n transmitters in the multipath communication system that are in operation (in other words, the transmitters that are participating in the data packet transmission). Moreover, the network load may be proportional to an average value of data rates s at which the transmitters (e.g., their applications) transmit data packets via the respective transmission paths. In some cases, the network load may be proportional to an averaged number of repeat transmissions (retransmissions) t on the transmission paths of the multipath communication system, the retransmissions on a transmission path representing the number of required retransmissions if the data packet is transmitted on the transmission path. In some cases, the network capacity r may be proportional to an average value of a sum of the transmission capacities of the transmission paths, a transmission capacity of a transmission path (including the receiver side and/or the transmitter side, for instance) representing a transmission rate that can be ensured by the transmission path for the data packet transmission. In one or more of the aforementioned cases, the averaging, for instance, may be carried out across multiple (e.g., all) transmitters of the multipath communication system that participate in the data packet transmission and/or across a corresponding time interval of the data packet transmission.

In one example, the network load parameter L may be defined in the following way:

$$L = \alpha \cdot \frac{s^a \cdot n^b \cdot (\beta + t^c)}{r^d}$$

where α, β, a, b, c and d are the predefined factors. It is possible that these factors assume the following exemplary list of values: α=1.1, β=1, a=1, b=2, c=1 and d=1.

In the present techniques, the "adaptive selection" step may include the adaptive selection 310 of a first scheduling scheme "LB; 30a" for the data packet transmission if the at least one network parameter does not satisfy the first predetermined network parameter criterion 21 and does not satisfy the second predetermined network parameter criterion 22. For example, the "adaptive selection" step may include the adaptive selection of the first scheduling scheme "LB; 30a" for the data packet transmission if the at least one network parameter exceeds the first predetermined threshold value and the second predetermined threshold value 21; 22 (see also the above discussions). As also mentioned above, the network load parameter may be selected as the network parameter, for instance. In the example of FIG. 4, the first predetermined network parameter criterion 21 in the rhomb of flow diagram 11 is able to be formulated as an inequation with regard to the network load parameter which is lower than the first predetermined threshold value, whereas the first predetermined network parameter criterion 22 in the rhomb of flow diagram 11 can be formulated as an inequation with regard to the network load parameter which is smaller than the second predetermined threshold value. In the present disclosure, the first scheduling scheme "LB; 30a" may be the load balancing scheme (LB) introduced earlier if each packet is individually transmitted only via one transmission path (see FIG. 3A). In some cases, the LB scheme may be advantageous if the network load parameter exceeds the two predetermined threshold values because this scheme may enable a reduction in the data traffic per transmission path in that the data packets are distributed to the different transmission paths. If required, the LB scheme is additionally able to increase interpacket times (e.g., double them as in the round robin method, e.g., in a cyclical data packet transmission for the two transmission paths) to reduce the wait queue lengths on the transmitter side.

The techniques of the present invention may furthermore include the selection 320 of a second scheduling scheme "PD; 31a" for the data packet transmission if the at least one network parameter does not satisfy the first predetermined network parameter criterion 21 and satisfies the second predetermined network parameter criterion 22 (for instance if the at least one network parameter exceeds the first predetermined threshold value and lies below the second predetermined threshold value), and if the determined signal-to-noise ratio (SNR) of data packets of the transmission path (for instance a first transmission path of a transmitter, a second transmission path of the transmitter, or of some other transmission path that differs from the first and second transmission path of the transmitter, or a combination thereof) satisfies a first predetermined criterion 23 (this criterion is schematically shown in FIG. 4 in the rhomb bearing reference number 23). In one example, the determined SNR of the transmission path may be an SNR average value of the transmission path, which was calculated by averaging the signal-to-noise ratios of a predefined number of data packets (such as 10 data packets or more, 50 data packets or more, 100 data packets or more) which were transmitted via this transmission path. In other examples, the determined SNR of the transmission path may be an SNR average value of the transmission path, which is calculated by averaging the signal-to-noise ratios that were transmitted via this transmission path within a predefined time interval (e.g., 1 ms or more, 10 ms or more, 100 ms or more). In some cases, the signal-to-noise ratios of one or more (such as all) transmission paths that extend from a transmitter to the respective receivers may be determined. In this way, the signal-to-noise ratios for multiple (e.g., all) transmitters, for example, are able to be determined.

In the present techniques, the first predetermined criterion may include that the determined signal-to-noise ratio (SNR) of data packets of the transmission path falls below an SNR threshold value (in this context, see also the following explanations for calculating the SNR threshold value). Returning to the example of FIG. 2: the signal-to-noise ratios in the above-defined sense are able to be determined for all three transmission paths "2; path1-path3". The first predetermined criterion in this exemplary embodiment may indicate that the first predetermined criterion is satisfied if the SNR of one of these three transmission paths falls below the SNR threshold value. In other examples, two or all of the three determined signal-to-noise ratios must fall below the SNR threshold value in order to satisfy the first predetermined criterion.

In addition, the method of the first aspect may include the calculation of an SNR network parameter which characterizes signal-to-noise ratios of data packets from the multiplicity of data packets that are transmitted via the communication network of the multipath communication system. In some cases, the SNR network parameter may be an average SNR value of signal-to-noise ratios of the data packets from the multiplicity of data packets that are transmitted via the communication network of the multipath communication system (or in other words, via the transmission paths encompassed by the communication network). For example, this SNR average value, which represents a global SNR of the communication system, is able to be calculated as an average value across the determined (afore-described) SNR average values of the multiplicity of (e.g., all) transmission paths of the multipath communication system.

In the next step, the method of the first aspect may include the calculation of the SNR threshold value based on the calculated SNR parameter. In some cases, the SNR threshold value can be calculated as a difference between the SNR network parameter and a predefined SNR displacement value. The predefined SNR displacement value is able to be selected from an interval of 0 dB to 5 dB, for example. It is possible that the SNR displacement value assumes the following, non-exhaustive list of values: 0.5 dB, 1.0 dB, 1.5 dB, 2.0 dB, 2.5 dB, 3.0 dB, 3.5 dB, 4.0 dB or 4.5 dB.

In the present disclosure, the second scheduling scheme "PD; 31a" may be the above-described packet duplication scheme (PD) in which the data packet is transmitted in replicated form and via one transmission path while its duplicate is transmitted via one or more other transmission paths (e.g., of the same transmitter). In this scheme, the receiver must wait for the first arriving duplicate of the data packet (or for the data packet itself if it arrives earlier), which may reduce the latency. In addition, the receiver is able to utilize the second transmitted duplicate in the event that a data packet gets lost, which may increase the reliability of the data transmissions.

In the other case, if the at least one network parameter does not satisfy the first predetermined network parameter criterion 21 and satisfies the second predefined network parameter criterion 22 (e.g., if the at least one network parameter exceeds the first predetermined threshold value and lies below the second predetermined threshold value), and if the determined signal-to-noise ratio of data packets of the transmission path does not satisfy the first predetermined criterion 23 (e.g., with regard to the SNR threshold value described in detail earlier in the text), the method of the first aspect may include the selection 330 of the first scheduling scheme "LB; 30b" for the data packet transmission. Here, the first scheduling scheme "LB; 30b" may be the load balancing scheme (LB), for example, which was introduced above.

The techniques of the present invention may also include the calculation of a collective wait queue length, which characterizes the determined wait queue lengths of data packets on the at least two transmission paths if the at least one network parameter (such as the above-described network load parameter) satisfies the first predetermined network parameter criterion 21 (for instance, if the at least one network parameter lies below the first predetermined threshold value). In one example, the collective wait queue length may be a weighted sum of the determined wait queue lengths of data packets (with the weight factors equal to one, for example) that are transmitted via the at least two transmission paths. In some cases, the collective wait queue length may be a sum of the determined wait queue lengths of data packets that are transmitted via the transmission paths (such as all transmission paths) that extend from a transmitter to the respective receivers. In some cases, the wait queue length for the transmission path (e.g., for every transmission path) may be determined as a wait queue length within a predefined time interval (e.g., a maximum measured value of the wait queue length within this time interval may be taken as the wait queue length for the respective transmission path). In this way, for instance, it is possible to determine the wait queue length for multiple (e.g., all) transmitters.

In the present techniques, the step of "the adaptive selection of the scheduling scheme" may include the selection 340 of the second scheduling scheme "PD; 31b" for the data packet transmission if the calculated collective wait queue length satisfies a second predetermined criterion 24 (this criterion is schematically shown in FIG. 4 in the rhomb denoted by reference number 24), and if the determined correlation satisfies a third predetermined criterion 25 (this criterion is schematically shown in FIG. 4 in the rhomb denoted by reference number 25). In this context, the correlation between one or more transmission path parameters of a first transmission path and one or more transmission path parameters of a second transmission path of the same transmitter, or of a first transmission path and another transmission path of the same transmitter which differs from the first and second transmission path, is able to be determined in some cases. In still other cases, the correlations between one or more transmission path parameters of all transmission paths which transmit data packets from the same transmitter to the receivers can be determined. A maximum correlation may then be taken from the determined correlations to check whether it satisfies the third predetermined criterion 25.

In the techniques of the present invention, the second predetermined criterion 24 may include that the calculated collective wait queue length falls below a predetermined wait queue threshold value. In addition, the third predetermined criterion 25 may include that the determined correlation falls below a predetermined correlation threshold value. As mentioned above, the correlation is able to be described with the aid of the Pearson correlation coefficient. For instance, the correlation threshold value may be selected from an interval of −1.0 to 1.0. It is possible that the correlation assumes the following, non-exhaustive list of values: −0.9, −0.5, −0.2, −0.1, 0.0, 0.1, 0.2, 0.5 or 0.9. As described above, in some examples this may involve the transmission paths of the same transmitter for selecting the scheduling scheme for this transmitter in an adaptive manner. In addition, it is possible, for example, to select the above-described packet duplication scheme (PD) as the second scheduling scheme "PD; 31b".

In the other case, if the calculated collective wait queue length satisfies the second predetermined criterion 24 and the determined correlation does not satisfy the third predetermined criterion 25 (for instance if the determined correlation exceeds the predetermined correlation threshold), then the method of the first aspect may include the selection 350 of a third scheduling scheme "PS; 32" for the data packet transmission. In the present disclosure, the third scheduling scheme "PS; 32" may be the above-described packet fragmentation scheme (PS) for the data packet transmission in which the data packet is fragmented and its fragments are transmitted via one or multiple other transmission paths (see FIG. 3C and the above discussions). In some cases, the PS scheme may be advantageous because it can provide a reduction of the size of useful data (payload) per transmission path, which can lead to the reduction of latencies. For example, the size of the data packets transmitted via the two transmission paths in the example of FIG. 3C is able to be halved.

The step of "the adaptive selection of the scheduling scheme" of the present invention may finally encompass the selection 360 of the first scheduling scheme "LB; 30c" (e.g., the above-described load balancing scheme (LB)) for the data packet transmission if the at least one network parameter satisfies the first predetermined network parameter criterion 21 (for instance if the at least one network parameter lies below the first predetermined threshold value) and if the calculated collective wait queue length does not satisfy the second predetermined criterion 24.

A second general aspect of the present invention relates to a computer program, which is designed to execute the method according to the first general aspect of the present invention.

The present invention also relates to a computer-readable medium (e.g., a machine-readable memory medium such as an optical memory medium or a read-only memory, e.g., a FLASH memory), and signals that store or encode the computer program according to the present invention.

A third general aspect of the present invention relates to an adaptive multipath scheduler 5 of a multipath communication system 1, which is designed to execute the method according to the first general aspect of the present invention and/or to execute the computer program according to the second general aspect.

Figure 5:
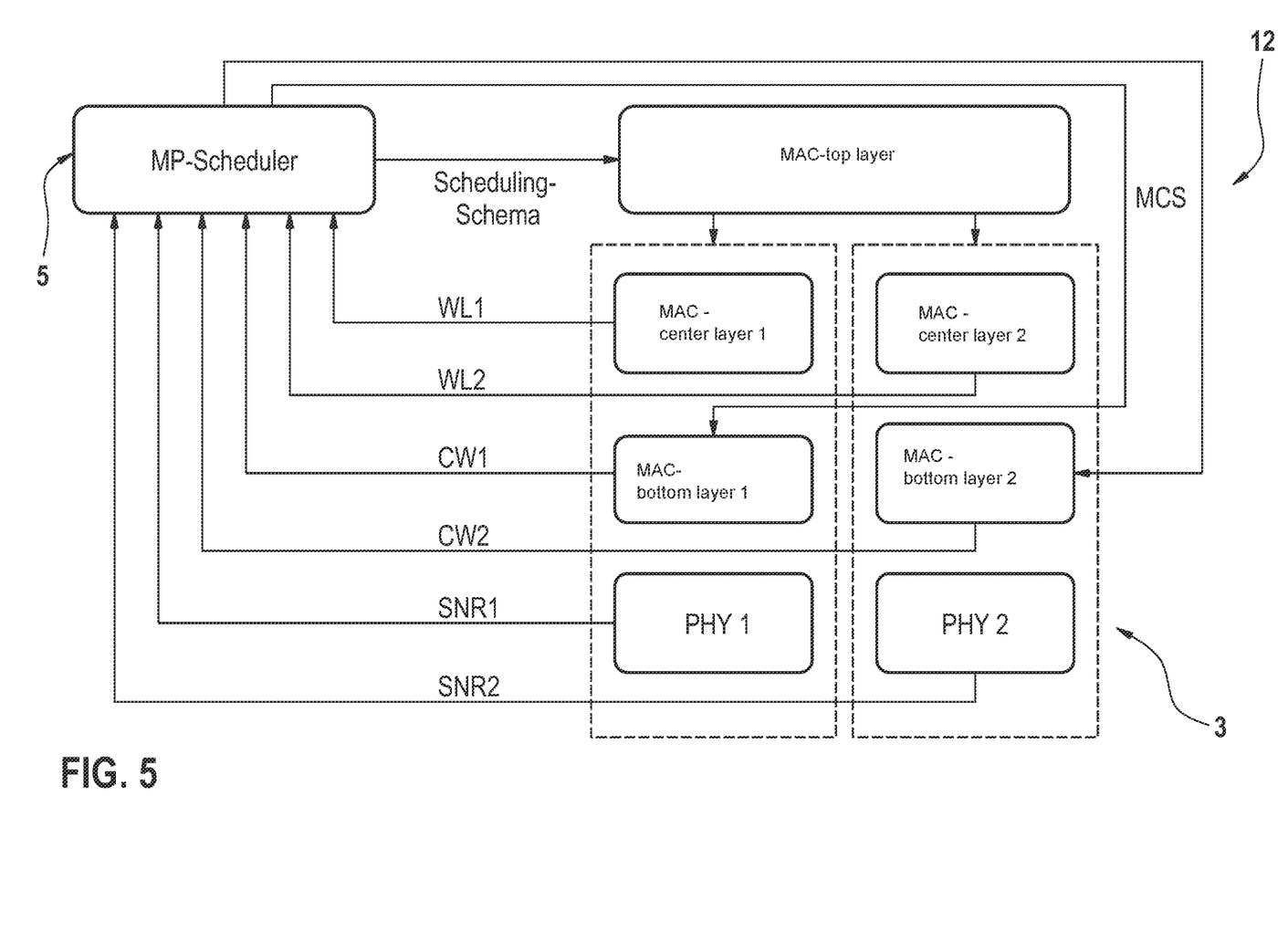
FIG. 5 schematically shows an exemplary architecture according to the preset invention for an implementation 12 of scheduling schemes 10 with an adaptive multipath scheduler 5 and two transmission paths of a multipath communication system using an ns-3 simulator (see here, for instance, the following link https://www.nsnam.org/), which may be used for the IEEE 802.11 standard. MAC: medium access control. PHY: physical layer. SNR: signal-to-noise ratio. WL wait queue length. CW contention window. MCS: modulation and coding scheme.

In some examples, the decision as to which scheduling scheme of the first aspect is to be used in which transmitter is able to be made in a multipath scheduler 5 shown in FIG. 5, which uses different transmission path parameters from the lower MAC layers (e.g., a MAC center layer, a MAC bottom layer or similar things), such as the wait queue length, the SNR, or a contention window (such as current values of these variables). In this example, the MAC top layer is jointly allocated to all transmission paths (for instance those that extend from a transmitter to the respective receivers), while the lower MAC layers are allocated to individual transmission paths (such as two transmission paths 2, as illustrated in FIG. 5). In other examples, a different layer may be jointly allocated to all transmission paths. The decision made by the multipath scheduler may be used in the MAC top layer in the example of FIG. 5, and the individual data packets (and/or their fragments) are able to be distributed to the individual lower MAC layers according to the scheduling scheme. In addition, in some cases, multipath scheduler 5 may transmit information about the corresponding modulation and encoding scheme that is used on a specific transmission path to the MAC bottom layer.

A fourth general aspect of the present invention relates to a multipath communication system which includes an adaptive multipath scheduler 5 according to the third aspect. In addition, the multipath communication system according to the fourth aspect includes a transmitter 3, which is designed to transmit a multiplicity of data packets to the receiver. The transmitter of the fourth aspect is able to be connected to the receiver via two or more transmission paths 2. The multipath communication system of the fourth aspect is designed to execute the method according to the first general aspect of the present invention.

What is claimed is:

1. A method for adaptive selection of a scheduling scheme for a data packet transmission of a data packet in a multipath communication system, the method comprising the following steps:
    determining at least two transmission path parameters for each transmission path of at least two transmission paths of two or more transmission paths for a multiplicity of data packets, the multiplicity of data packets being transmitted via the two or more transmission paths of the multipath communication system;
    determining a correlation between: at least one transmission path parameter of the at least two transmission path parameters of a transmission path of the two or more transmission paths for the multiplicity of data packets, and a corresponding transmission path parameter of the at least two transmission path parameters of one or more other transmission paths of the two or more transmission paths for the multiplicity of data packets; and
    adaptively selecting a scheduling scheme for the data packet transmission via the two or more transmission paths at least based on the determined transmission path parameters and the correlation.

2. The method as recited in claim 1, further comprising determining at least one network parameter of a communication network of the multipath communication system, the adaptive selection further being carried out based on the at least one network parameter of the communication network.

3. The method as recited in claim 1, wherein the adaptive selection of the scheduling scheme for the data packet transmission is implemented via the two or more transmission paths according to a time schedule or automatically after a predetermined trigger event, the time schedule including that a predetermined number of data packets of the multiplicity of data packets should be transmitted before the adaptive selection is implemented, the predetermined trigger event including that one or more transmission path parameters of one or more transmission paths satisfies a transmission path parameter criterion.

4. The method as recited in claim 1, wherein the at least two transmission path parameters of the transmission path of at least two transmission paths include a respective wait queue length and a signal-to-noise ratio of data packets of the multiplicity of data packets which are transmitted via the transmission path of the at least two transmission paths.

5. The method as recited in claim 2, wherein a first predetermined network parameter criterion and a second predetermined network parameter criterion are allocated the at least one network parameter of the communication network, the first predetermined network parameter criterion including that the at least one network parameter of the communication network falls below a first predetermined threshold value, the second predetermined network parameter criterion including that the at least one network parameter of the communication network falls below a second predetermined threshold value, the second predetermined threshold value being greater than the first predetermined threshold value.

6. The method as recited in claim 5, wherein the adaptive selection of the scheduling scheme includes an adaptive selection of a first scheduling scheme for the data packet transmission when the at least one network parameter does not satisfy the first predetermined network parameter criterion and does not satisfy the second predetermined network parameter criterion.

7. The method as recited in claim 5, wherein the adaptive selection of the scheduling scheme includes the following steps when the at least one network parameter does not satisfy the first predetermined network parameter criterion and satisfies the second predetermined network parameter criterion:
    selecting a second scheduling scheme for the data packet transmission when a determined signal-to-noise ratio (SNR) of data packets of the transmission path satisfies a first predetermined criterion, and otherwise, when the determined SNR of data packets of the transmission path does not satisfy the first predetermined criterion, selecting the first scheduling scheme for the data packet transmission.

8. The method as recited in claim 7, wherein the first predetermined criterion includes that the determined SNR of data packets of the transmission path falls below an SNR threshold value, and the method includes the following steps:
    calculating an SNR network parameter, which characterizes signal-to-noise ratios of data packets from the multiplicity of data packets that are transmitted via the communication network of the multipath communication system; and
    calculating the SNR threshold value based on the calculated SNR parameter.

9. The method as recited in claim 7, wherein the at least two transmission path parameters of the transmission path of at least two transmission paths include a respective wait queue length and a signal-to-noise ratio of data packets of the multiplicity of data packets which are transmitted via the transmission path of the at least two transmission paths, and the method further comprises calculating a collective wait queue length, which characterizes the determined wait queue lengths of data packets on the at least two transmission paths when the at least one network parameter satisfies the first predetermined network parameter criterion.

10. The method as recited in claim 9, wherein the adaptive selection of the scheduling scheme includes the following steps when the calculated collective wait queue length satisfies a second predetermined criterion:
    selecting the second scheduling scheme for the data packet transmission when the determined correlation satisfies a third predetermined criterion, and, otherwise, selecting a third scheduling scheme for the data packet transmission, the second predetermined criterion including that the calculated collective wait queue length falls below a predetermined wait queue threshold value, and the third predetermined criterion including that the determined correlation falls below a predetermined correlation threshold value.

11. The method as recited in claim 10, wherein the adaptive selection of the scheduling scheme includes the selection of the first scheduling scheme for the data packet transmission when the at least one network parameter satisfies the first predetermined network parameter criterion and when the calculated collective wait queue length does not satisfy the second predetermined criterion.

12. A non-transitory computer readable medium on which is stored a computer program for adaptive selection of a scheduling scheme for a data packet transmission of a data packet in a multipath communication system, the computer program, when executed by a computer, causing the computer to perform the following steps:
- determining at least two transmission path parameters for each transmission path of at least two transmission paths of two or more transmission paths for a multiplicity of data packets, the multiplicity of data packets being transmitted via the two or more transmission paths of the multipath communication system;
- determining a correlation between at least one transmission path parameter of at least two transmission path parameters of a transmission path and a corresponding transmission path parameter of at least two transmission path parameters of one or more other transmission paths of the two or more transmission paths for the multiplicity of data packets; and
- adaptively selecting a scheduling scheme for the data packet transmission via the two or more transmission paths at least based on the determined transmission path parameters and the correlation.

13. An adaptive multipath scheduler of a multipath communication system, the adaptive multipath scheduler configured for adaptive selection of a scheduling scheme for a data packet transmission of a data packet in a multipath communication system, the adaptive multipath scheduler configured to:
- determine at least two transmission path parameters for each transmission path of at least two transmission paths of two or more transmission paths for a multiplicity of data packets, the multiplicity of data packets being transmitted via the two or more transmission paths of the multipath communication system;
- determine a correlation between at least one transmission path parameter of at least two transmission path parameters of a transmission path and a corresponding transmission path parameter of at least two transmission path parameters of one or more other transmission paths of the two or more transmission paths for the multiplicity of data packets; and
- adaptively select a scheduling scheme for the data packet transmission via the two or more transmission paths at least based on the determined transmission path parameters and the correlation.

14. A multipath communication system, comprising:
an adaptive multipath scheduler;
a transmitter configured to transmit a multiplicity of data packets to a receiver;
the receiver, the transmitter being connected to the receiver via two or more transmission paths;
wherein the multipath communication system is configured for adaptive selection of a scheduling scheme for a data packet transmission of a data packet in the multipath communication system, using the adaptive multipath schedule, the adaptive multipath schedule configured to:
- determine at least two transmission path parameters for each transmission path of at least two transmission paths of the two or more transmission paths for a multiplicity of data packets, the multiplicity of data packets being transmitted via the two or more transmission paths of the multipath communication system;
- determine a correlation between at least one transmission path parameter of at least two transmission path parameters of a transmission path and a corresponding transmission path parameter of at least two transmission path parameters of one or more other transmission paths of the two or more transmission paths for the multiplicity of data packets; and
- adaptively select a scheduling scheme for the data packet transmission via the two or more transmission paths at least based on the determined transmission path parameters and the correlation.

* * * * *